C. G. HACKETT.
BOTTLE CARRIER.
APPLICATION FILED MAR. 13, 1920.
1,411,695.
Patented Apr. 4, 1922.
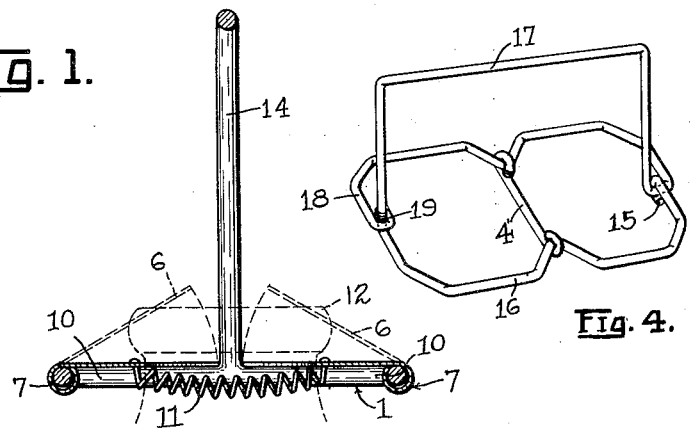
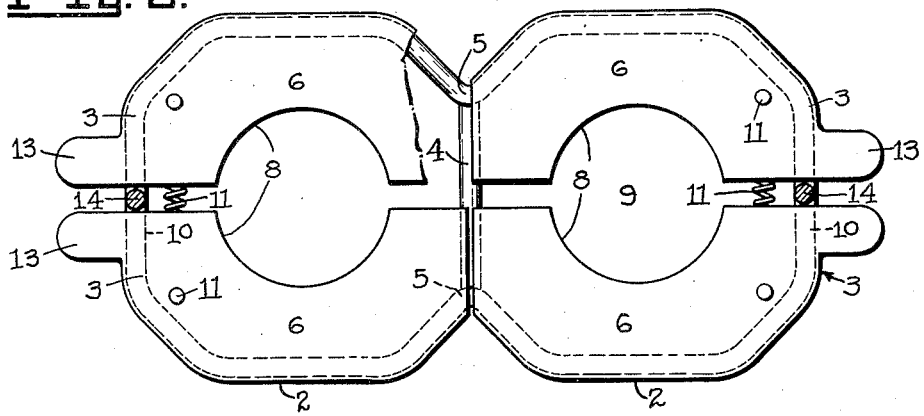
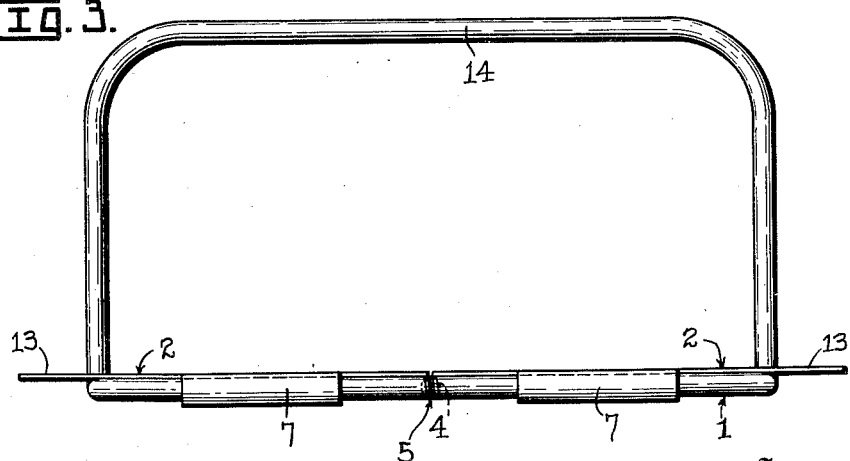
Inventor
Clarence G. Hackett.
By his Attorney
Mason Fenwick Lawrence.

UNITED STATES PATENT OFFICE.

CLARENCE G. HACKETT, OF SEATTLE, WASHINGTON.

BOTTLE CARRIER.

1,411,695.   Specification of Letters Patent.   Patented Apr. 4, 1922.

Application filed March 13, 1920. Serial No. 365,553.

*To all whom it may concern:*

Be it known that I, CLARENCE G. HACKETT, a citizen of the United States, residing at Seattle, in the county of King and State of Washington, have invented certain new and useful Improvements in Bottle Carriers; and I do hereby declare the following to be a full, clear, and exact description of the invention, such as will enable others skilled in the art to which it appertains to make and use the same.

This invention relates to new and useful improvements in bottle carriers and more particularly to a device for suspending the carrying milk bottles and the like, the main object of the present invention being the provision of a carrier whereby the bottles can be readily engaged about the neck portion thereof for supporting and carrying the same to any desired destination and readily released when desired.

A further object of the present invention is the provision of an improved bottle carrier adapted for use in picking up and carrying bottles and particularly milk and cream bottles of the type in general use which are provided with a flange around the outside of the mouth of the bottle.

A further object of the invention is the provision of a carrier of this type which can be easily and cheaply manufactured so that the same may be generally utilized for carrying milk bottles in various quantities and which by their simple and accurate action may be used by young children to provide them with a handle for carrying the bottles and a substantial grip for holding the same.

A still further object of the invention is the provision of a simple device which includes in its construction a wire frame having spring actuated plates hinged to the frame and adapted for gripping engagement with the neck of the bottle beneath the flange at the outer end of the neck for suspending and carrying the bottle and wherein the bottle can be readily released when desired.

With the above and other objects in view, the invention consists in the novel features and construction, the combination and arrangement of parts hereinafter more fully set forth, pointed out in the claims and shown in the accompanying drawings in which—

Figure 1 is a transverse sectional view illustrating in dotted lines the position of the gripping plates when the bottle is being released, Figure 2 is a top plan view, the side portions of the bail being illustrated in cross-section, Figure 3 is a side elevation, and Figure 4 is a perspective view illustrating the manner of constructing the frame of a single piece of heavy wire.

Before describing the general construction of my improved bottle carrier, I wish it to be understood that, while I have illustrated the frame in the present instance as designed for carrying two bottles, that the same may be constructed along the same general outline for use upon one or a quantity of bottles. In the construction of the design illustrated in the accompanying drawings, I first provide a frame generally indicated by the numeral 1 which in the present instance is formed for carrying two bottles and includes two octagonal sections which include the strong longitudinal side portions 2 on the transverse outer end portions 3, the inner end portion of both sections being formed by the transverse member 4. This transverse member 4 is formed by having either a separate piece of wire engaged with the intermediate portions of the indentations 5 or intricately formed therewith.

The clamping plates 6 which retain the bottles in a suspended position are, as illustrated, preferably of a design to correspond with the shape of the sections which comprises the frame of the carrier and are provided upon the outer edges with an extension adapted to be bent inwardly to provide a collar 7 which embraces the longitudinal edges 2 of the sections whereby the plates are hingedly connected to the sections for outward swinging movement. It will be noted that each section is provided with two plates, one arranged upon each side of the center of the section and each plate being provided with semi-circular recess 8 whereby a substantially circular opening 9 is formed for the reception of the neck of the bottle to be suspended.

The plates 6 are so mounted upon the frame that the inner ends will rest upon the transverse portion 4 while the outer ends will rest upon the outer transverse portions 10 of the frame. In order to retain the plates 6 in their normal engaging positions upon the frame, a coil spring 11 is provided, the ends of which are secured to opposed plate members upon each section of the frame, as will be clearly illustrated in Figures 1 and 2, thus retaining the clamping plates 6 in a normally closed or clamping position.

When it is desired to suspend a bottle within the carrier, the carrier is engaged with the top of the bottle so that the flange 12 at the mouth of the bottle will come within the outlines of each section of the frame as illustrated in Figure 1 and as the frame is pressed downwardly, the mouth of the bottle will be forced upwardly between the plates 6, against the tension of the spring 11, so that after the edges of the plate pass the flange at the outer end of the neck of the bottle, the tension of the springs 11 will return the plates to their normal position upon the sections of the frame so that when the frame is raised, the plates will engage the flange of the bottle and suspend the same within the frame.

Should it be desired to release the bottle from between the clamping plates, suitable finger pieces 13 are provided for in the form of elongated extensions at the outer ends of each of the plates adapted to be grasped by the fingers of the operator so as to swing the plates outwardly away from the neck of the bottle against the tension of the spring 11, whereby the bottle can be readily released from between the clamping plates. It will be noted that after the bottle has been released from between the clamping plates, the tension of the spring 11 will return the plates to their normal positions upon the sections of the frame. In order that the frame may be readily carried from place to place, I have illustrated in the accompanying drawings a suitable bail 14 of substantially U-shaped construction, the ends of which are connected in any suitable manner to the outer transverse portions 10 of the sections of the frame, while the intermediate portion constitutes the handle grip of the bail. From this, it will be apparent that the bail 14 can be readily grasped to facilitate the carrying of the frame from place to place. It will be noted that the carrier can be readily engaged with the bottle by simply lowering the carrier so that the mouth of the bottle engages with the plate 6 and pushing downwardly on the carrier until the flange portion of the bottle has passed the inner edges of the plates, thus permitting them to be returned to their normal positions through the tension of the spring 11.

Thus it can be seen that the carrier can be operated with one hand and thus eliminate the grasping of the bottle with the other hand.

In Figure 4, I have illustrated the invention as constructed of a single piece of heavy wire and in this construction, one end of the wire is bent upon itself to form a loop 15. The wire is then extended around to form one half of the frame as shown by the numeral 16, thence extended upwardly and across the length of the frame, thence downwardly to form the bail 17. After the bail 17 has been formed, the wire is engaged with the loop 15, thence extended around to form the opposite side of the frame, indicated by the numeral 18 and the remaining end of the wire being bent upon itself to form a loop 19 adapted to be engaged with the frame at the point where the wire is extended from the body of the frame, outwardly to form the bail 17. It is thought that by forming the frame in this manner, the same can be quickly and cheaply manufactured. It will be noted that in the single piece construction of the frame, the plates 6 will be mounted upon the frame as heretofore described and the transverse portion 4' which connects the frame between the sections will also be attached or secured to the side portions of the frame as in the preferred form of the invention.

Attention is called to the fact that the bottle can be readily released from between the clamping plates 6 without the necessity of manipulating the plates through the medium of the finger pieces 13 and to accomplish this, it is only necessary to press downwardly upon the bail until the neck of the bottle has been projected up through the plates 6, the bottle can be grasped by the neck and pulled directly through the plates.

What I claim is:

1. A bottle carrier including a frame, opposed clamping plates normally resting on the frame and hinged at their outer edges to the frame for outward swinging movement, the inner edges of said plates being recessed to receive the neck of a bottle and coil springs connecting said plates to retain them in their normal positions.

2. A bottle carrier including a frame, clamping plates hinged to the frame and normally resting thereon, said clamping plates being arranged in opposed relation and provided within their opposed edges with recesses to receive the neck of a bottle, means for retaining the plates in their normal positions and means carried by the plates whereby to manually operate the same.

3. A bottle carrier including a frame, clamping plates hinged to the frame and normally resting thereon, said plates being provided with opposed recesses to receive the neck of a bottle, coil springs connecting the plates to retain them in their normal positions and finger pieces projecting from the plates at one side of the frame whereby to manually operate said plates.

4. A bottle carrier including a frame, opposed clamping plates normally resting on the frame and hinged at their outer edges to the frame, the inner edges of said plates being recessed to receive the neck of a bottle, means for retaining said plates in their normal positions and means whereby to manually actuate said plates.

In testimony wherof I affix my signature.

CLARENCE G. HACKETT.